US012703519B2

(12) United States Patent
Baladhandapani et al.

(10) Patent No.: US 12,703,519 B2
(45) Date of Patent: Aug. 11, 2026

(54) SYSTEM AND METHOD FOR INCREASING AIRCRAFT SEARCH AND RESCUE MISSION EFFECTIVENESS

(71) Applicant: HONEYWELL INTERNATIONAL INC., Charlotte, NC (US)

(72) Inventors: Gobinathan Baladhandapani, Madurai (IN); Hariharan Saptharishi, Madurai (IN); Rahul R, Madurai (IN); Sivakumar Kanagarajan, Bangalore (IN); Sunit Kumar Saxena, Urbana, OH (US); Vignesh K, Madurai (IN)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 452 days.

(21) Appl. No.: 17/663,459

(22) Filed: May 16, 2022

(65) Prior Publication Data

US 2023/0367315 A1 Nov. 16, 2023

(51) Int. Cl.
*B64U 20/87* (2023.01)
*B64D 47/02* (2006.01)
(Continued)

(52) U.S. Cl.
CPC ............ *B64U 20/87* (2023.01); *B64D 47/02* (2013.01); *G05D 1/0044* (2013.01); (Continued)

(58) Field of Classification Search
CPC .. G05D 1/0094; G05D 1/0044; B64C 39/024; B64D 47/02; B64D 47/08; B64U 2201/20; B64U 2101/30; H04N 7/183
See application file for complete search history.

(56) References Cited

U.S. PATENT DOCUMENTS 5,589,901 A * 12/1996 Means .................. B64D 47/08 396/12
6,678,395 B2 * 1/2004 Yonover ............. G06V 10/255 382/103
(Continued)

OTHER PUBLICATIONS

Youtube video by Geospatial World, “What is Lidar? How does Lidar work? Know all about LiDAR”, Sep. 12, 2017, Youtube, Timestamps 0:40-1:00 and 2:38-4:09; https://www.youtube.com/watch?v=H2-Yp30TGk4; automatically generated transcript provided as attached NPL saved as PDF (Year: 2017).*

*Primary Examiner* — Kenneth M Dunne
(74) *Attorney, Agent, or Firm* — Ingrassia, Fisher & Lorenz LLP

(57) ABSTRACT

An aircraft search and rescue mission effectiveness system includes a display device, a searchlight assembly, and a searchlight processing system. The searchlight assembly emits a light beam toward, and thus illuminates, a point of interest, and supplies beam data that includes at least light beam orientation and distance from the searchlight assembly to the point of interest. The searchlight processing system receives aircraft data and is configured to: process the aircraft data and the beam data to generate and supply geographic coordinate data for the point of interest, command the display device to render an image that includes at least a graphical representation of the point of interest and the geographic coordinate data for the point of interest, receive a user input command, and in response to receiving the user input command, to transmit the geographic coordinate data to one or more aircraft avionics systems.

18 Claims, 8 Drawing Sheets

(51) Int. Cl.
*B64U 101/30* (2023.01)
*G05D 1/00* (2024.01)
*H04N 7/18* (2006.01)

(52) U.S. Cl.
CPC ....... *G05D 1/0094* (2013.01); *B64U 2101/30* (2023.01); *B64U 2201/20* (2023.01); *H04N 7/183* (2013.01)

(56) References Cited

U.S. PATENT DOCUMENTS

| | | | | |
|---|---|---|---|---|
| 6,962,423 | B2 * | 11/2005 | Hamilton | B64D 47/08 362/240 |
| 7,663,530 | B2 | 2/2010 | Perry et al. | |
| 8,209,122 | B2 | 6/2012 | Nichols et al. | |
| 9,311,551 | B2 | 4/2016 | Hayes et al. | |
| 9,547,990 | B2 * | 1/2017 | Ling | B64C 27/006 |
| 9,645,582 | B2 | 5/2017 | Shue | |
| 9,716,862 | B1 | 7/2017 | Evans | |
| 9,891,632 | B1 * | 2/2018 | Irwin | G05D 1/0676 |
| 10,417,918 | B2 | 9/2019 | Reddy et al. | |
| 10,872,533 | B1 | 12/2020 | Walker et al. | |
| 10,882,637 | B1 * | 1/2021 | Das | H04N 23/695 |
| 2009/0122295 | A1 * | 5/2009 | Eaton | G01S 17/89 342/357.31 |
| 2010/0039294 | A1 | 2/2010 | Feyereisen et al. | |
| 2013/0182449 | A1 * | 7/2013 | Fidanza | B64D 47/04 362/470 |
| 2013/0261849 | A1 * | 10/2013 | Jungwirth | B64D 47/02 701/1 |
| 2015/0066248 | A1 * | 3/2015 | Arbeit | G08G 5/006 701/2 |
| 2017/0178517 | A1 * | 6/2017 | Arneau | G08G 5/34 |
| 2017/0206790 | A1 * | 7/2017 | Reddy | G08G 5/0086 |
| 2018/0093769 | A1 | 4/2018 | Sequeira et al. | |
| 2018/0336788 | A1 * | 11/2018 | Singla | G08G 5/0047 |
| 2019/0063713 | A1 * | 2/2019 | Hessling-Von Heimendahl | F21S 10/026 |
| 2020/0172264 | A1 * | 6/2020 | Das | G08G 5/02 |
| 2020/0191946 | A1 | 6/2020 | Kalyandurg et al. | |
| 2020/0240602 | A1 * | 7/2020 | Huang | G06V 20/13 |
| 2022/0262263 | A1 * | 8/2022 | Elhossini | G05D 1/0094 |
| 2022/0365534 | A1 * | 11/2022 | Kuhlman | G05D 1/104 |
| 2023/0168332 | A1 * | 6/2023 | Cellerier | B64C 39/024 340/539.13 |

* cited by examiner 100
102
106
SEARCH LIGHT ASSEMBLY
114-1
WIDE BEAM
114-2
NARROW BEAM
114-3
LASER
116
MOTOR(S)
118
SENSOR(S)
158
CAMERA
108
SEARCH LIGHT PROCESSING SYSTEM
120
PROCESSOR
154
I/O
155
122
MEMORY
128
PROGRAM PRODUCT
124
PROGRAM
104
DISPLAY DEVICE
112
136
ADAP
138
134-1
TERRAIN DB
134-2
FMS
134-N
OTHER AVIONICS
132
AIRCRAFT INERTIAL NAV SYSTEM
126
USER INTERFACE DEVICE
142
XMTR
148
CLOUD SERVICE
144
AIRCRAFT
146
GROUND STATION

SYSTEM AND METHOD FOR INCREASING AIRCRAFT SEARCH AND RESCUE MISSION EFFECTIVENESS

TECHNICAL FIELD

The present disclosure generally relates to aircraft search and rescue systems, and more particularly relates to systems and methods for increasing the effectiveness of aircraft search and rescue missions.

BACKGROUND

Various search and rescue operations, such as law enforcement operations, fire patrol operations, air ambulance operations, and various other operations may involve multiple aircraft, all of which need to know the location of various targets, landmarks, landing areas, or other points of interest on the ground. In many cases, these operations are time and safety sensitive. Thus, locating and sharing these points of interest may be important to accomplish the operation/mission objectives.

During some search and rescue operations, pilots may experience the need for frequent, unexpected, and/or immediate landing, hovering, and/or dynamic route changes. For operations over a relatively large area by multiple aircraft, careful coordination at designated landing ports is desirable. This can be a challenge for operations over complicated terrain due to the unavailability of existing landing ports and/or lack of terrain visibility. Although the flight management system (FMS) in many aircraft provides various preprogrammed data associated with various terrain, the data may not include suitable regions that can serve as a quick landing spot for when manpower and rescue equipment are to be deployed on the ground. Thus, these data may need to be shared by a crew/on scene coordinator, which can further increase their workload Hence, there is a need for a system and method that allows precise and quick point of interest location identification and sharing, thereby reducing pilot/crew/coordinator workload, and enhancing the effectiveness of the mission and coordination among all member aircraft involved in the mission and the ground control room. The present disclosure meets at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft search and rescue mission effectiveness system includes a display device, a searchlight assembly, and a searchlight processing system. The display device is responsive to display commands to render one or more images. The searchlight assembly is adapted to be mounted on an aircraft and is configured to emit a light beam toward, and thus illuminate, a point of interest. The searchlight assembly is further configured to supply beam data that includes at least light beam orientation and distance from the searchlight assembly to the point of interest. The searchlight processing system is coupled to receive aircraft data that includes at least aircraft location and aircraft attitude. The searchlight processing system is in operable communication with the display device and the searchlight assembly and is configured to: (i) process the aircraft data and the beam data to generate and supply geographic coordinate data for the point of interest, (ii) command the display device to render an image that includes at least a graphical representation of the point of interest and the geographic coordinate data for the point of interest, (iii) receive a user input command from a user interface device, and (iv) in response to receiving the user input command, to transmit the geographic coordinate data to one or more aircraft avionics systems.

In another embodiment, an aircraft search and rescue mission effectiveness method includes supplying beam data from a searchlight assembly that is adapted to be mounted on an aircraft and that is configured to emit a light beam toward, and thus illuminate, a point of interest, where the beam data includes at least light beam orientation and distance from the searchlight assembly to the point of interest. The beam data and aircraft data that includes at least aircraft location and aircraft attitude are processed, in a searchlight processing system, to generate and supply geographic coordinate data for the point of interest. A display device is commanded, via the searchlight processing system, to render an image that includes at least a graphical representation of the point of interest and the geographic coordinate data for the point of interest. A user input command from a user interface device is received, at the searchlight processing system, and the geographic coordinate data is transmitted, via the searchlight processing system, to one or more aircraft avionics systems in response to receiving the user input command.

In yet another embodiment, an aircraft includes a fuselage, a display device, a searchlight assembly, and a searchlight processing system. The display device is disposed within the fuselage and is responsive to display commands to render one or more images. The searchlight assembly is mounted on the fuselage and is configured to emit a light beam toward, and thus illuminate, a point of interest. The searchlight assembly is further configured to supply beam data, where the beam data includes at least light beam orientation and distance from the searchlight assembly to the point of interest. The searchlight processing system is coupled to receive aircraft data that includes at least aircraft location and aircraft attitude. The searchlight processing system is in operable communication with the display device and the searchlight assembly and is configured to: (i) process the aircraft data and the beam data to generate and supply geographic coordinate data for the point of interest, (ii) command the display device to render an image that includes at least a graphical representation of the point of interest and the geographic coordinate data for the point of interest, (iii) receive a user input command from a user interface device, and (iv) in response to receiving the user input command, to transmit the geographic coordinate data to one or more aircraft avionics systems.

Furthermore, other desirable features and characteristics of the aircraft search and rescue mission effectiveness system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
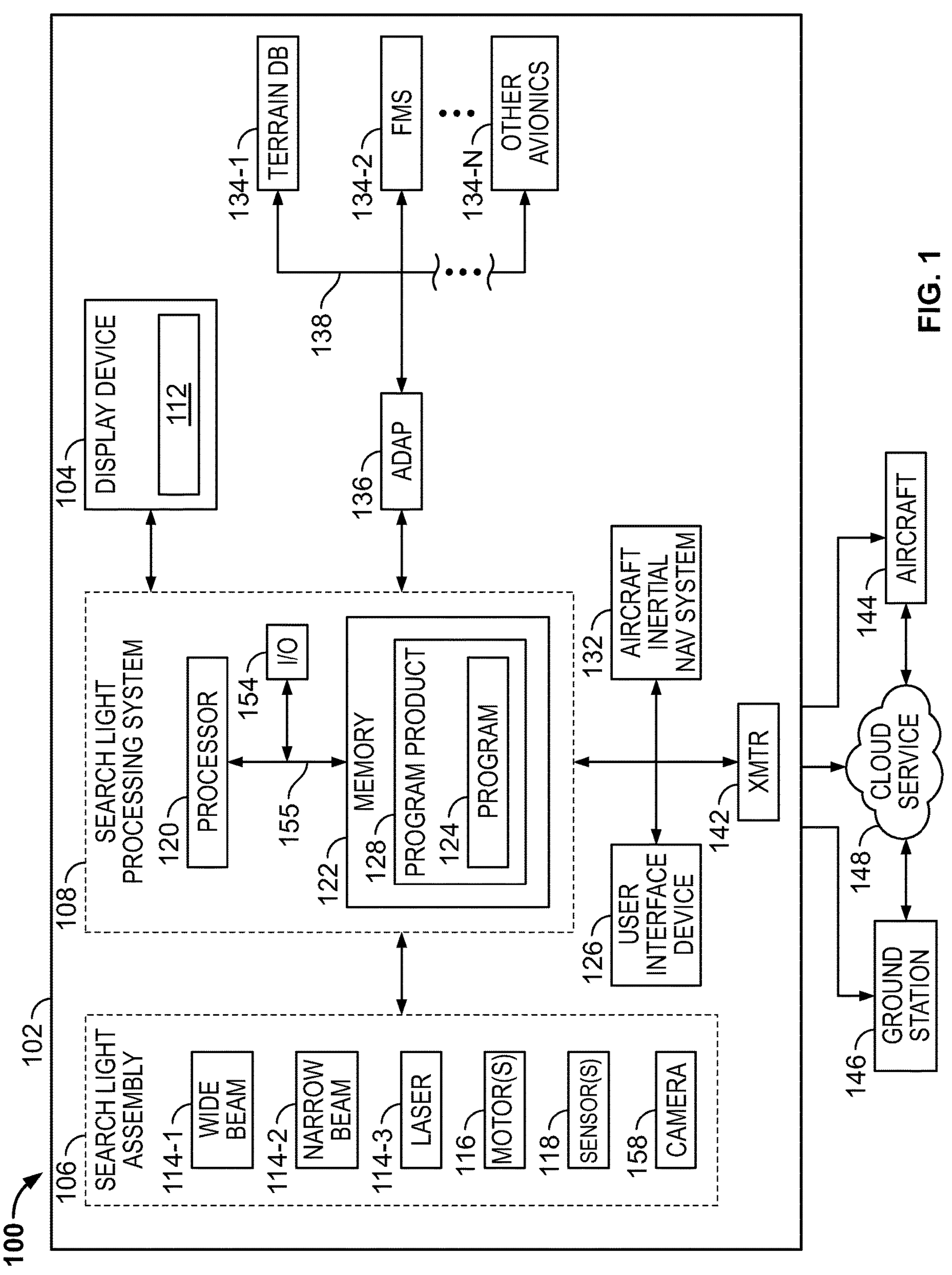
FIG. 1 is a functional block diagram of one embodiment of an aircraft search and rescue mission effectiveness system.

Referring to FIG. 1, a functional block diagram of one embodiment of an aircraft search and rescue mission effectiveness system 100 is depicted. The system 100 is at least partially disposed in, or on, an aircraft 102, and includes at least a display device 104, a searchlight assembly 106, and a searchlight processing system 108. The aircraft 102 may be any one of numerous types of aircraft, including both fixed-wing aircraft and rotary aircraft.

The display device 104 is disposed within the aircraft 102 and is responsive to display commands to render one or more images. In this regard, the display device 104 includes a display 112 on which the one or more images are rendered. Various ones of the images that are rendered will be described in more detail further below. It will be appreciated that the display device 104 may be implemented using one or more electronic display devices, such as a multi-function display (MFD) or a multi-function control display unit (MCDU), configured as any combination of: a head up display (HUD), an alphanumeric display, a vertical situation display (VSD), and a lateral navigation display (ND).

The searchlight assembly 106 is mounted on the aircraft 102 and is configured to emit a light beam toward, and thus illuminate, a point of interest. As used herein, the term "point of interest" encompasses areas ranging in size from a point, to a relatively large area. The size of the point of interest may vary depending, for example, on the type of light beam that is emitted. In this regard, the searchlight assembly 106 may include one or more light sources 114 each of which is configured to emit different photometric beam patterns and/or different types of light. For example, the searchlight assembly 106 may include one or more of a wide beam light source 114-1 that is operable to emit a relatively wide beam pattern (e.g., approximately 15-degrees horizontal X 15-degrees vertical), a narrow beam light source 114-2 that is operable to emit a relatively narrow beam pattern (e.g., approximately 4-degrees horizontal X 4-degrees vertical), and a laser light source 114-3 that is operable to emit a laser beam. It will be appreciated that each light source 114 may be configured to emit visible light and/or infrared (IR) light. When the searchlight assembly 106 includes more than one light source 114, the specific light source 114 that is used may be selected by a user (e.g., pilot or other flight crew member).

In addition to emitting the light beam, the searchlight assembly 106 is also configured to supply beam data. As used herein, "beam data" includes at least the orientation of the light beam and the distance from the searchlight assembly 106 to the point of interest. To implement this functionality, the searchlight assembly 106 may include one or more motors 116 and one or more sensors 118. The one or more motors 116 are used to control the orientation of the light source(s) 114 (as used herein, the orientation of the light source(s) 114 refers to the orientation thereof with respect to earth). The one or more sensors 118 detect the orientation of the light source(s) 114, and thus the light beam, and also sense the distance from the searchlight assembly 106 to the point of interest. The one or more sensors 118 may be variously implemented and may include, for example, various types of position sensors for detecting light source(s) 114 orientation and/or various range detectors (e.g., laser detectors) for sensing the distance from the searchlight assembly 106 to the point of interest, just to name a few.

The searchlight processing system 108 is in operable communication with the display device 104 and the searchlight assembly 106, and implements numerous and varied functions, which are described further below. As used herein, the term "processing system" refers to any means for facilitating communications and/or interaction between the elements of the system 100 and performing additional processes, tasks and/or functions to support operation of the system 100, as described herein. In various embodiments, the searchlight processing system 108 may be any hardware, software, firmware, electronic control component, processing logic, and/or processor device, individually or in any combination. Depending on the embodiment, the searchlight processing system 108 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the searchlight processing system 108 is depicted as a computer system comprising a processor 120 and a memory 122. The processor 120 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 122 may comprise RAM memory, ROM memory, flash memory, registers, a hard disk, or another suitable non-transitory short or long-term storage media capable of storing computer-executable programming instructions or other data for execution. The memory 122 may be located on and/or co-located on the same computer chip as the processor 120. Generally, the memory 122 maintains data bits and may be utilized by the processor 120 as storage and/or a scratch pad during operation. Specifically, the memory 122 may store instructions and applications embodied as a novel program 124. Information in the memory 122 may be organized and/or imported from an external source during an initialization step of a process; it may also be programmed via a user interface device 126. During operation, the processor 120 loads and executes the novel program 124 contained within the memory 122 and, as such, controls the general operation of the searchlight processing system 108 as well as the system 102.

The novel program 124 includes rules and instructions which, when executed, convert the processor 120/memory 122 configuration into the searchlight processing system 108, which is a novel search and rescue mission effectiveness processing system that performs the functions, techniques, and processing tasks associated with the operation of the system 100. The novel program 124 and associated stored variables may be stored in a functional form on computer readable media, for example, as depicted, in memory 122. While the depicted exemplary embodiment of the searchlight processing system 108 is described in the context of a fully functioning computer system, those skilled in the art will recognize that the mechanisms of the present disclosure are capable of being distributed as a program product 128.

As a program product 128, one or more types of non-transitory computer-readable signal bearing media may be used to store and distribute the program 124, such as a non-transitory computer readable medium bearing the program 124 and containing therein additional computer instructions for causing a computer processor (such as the processor 120) to load and execute the program 124. Such a program product 128 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 122 and as program product time-based viewing of clearance requests in certain embodiments.

In various embodiments, the processor 120 and memory 122 of the searchlight processing system 108 may be communicatively coupled (via a bus 155) to an input/output (I/O) interface 154. The bus 155 serves to transmit programs, data, status and other information or signals between the various components of the searchlight processing system 108. The bus 155 can be any suitable physical or logical means of connecting computer systems and components. This includes, but is not limited to, direct hard-wired connections, fiber optics, infrared and wireless bus technologies.

The I/O interface 154 enables intra searchlight processing system 108 communication, as well as communications between the searchlight processing system 108 and other system 102 components, and between the searchlight processing system 108 and non-illustrated external data sources. The I/O interface 154 may include one or more network interfaces and can be implemented using any suitable method and apparatus. In various embodiments, the I/O interface 154 is configured to support communication from an external system driver and/or another computer system.

As FIG. 1 further depicts, the system 100 additionally includes the above-mentioned user interface device 126. The user interface device 126 and the searchlight processing system 108 are cooperatively configured to allow a user (e.g., a pilot, co-pilot, or other flight crew member) to interact with display device 104 and/or other elements of the system 100, as described in greater detail below. Depending on the embodiment, the user interface device 126 may be realized as a cursor control device (CCD), keypad, touchpad, keyboard, mouse, touch panel (or touchscreen), joystick, knob, line select key, voice controller, gesture controller, or another suitable device adapted to receive input from a user. When the user interface device 126 is configured as a touchpad or touchscreen, it may be integrated with the display device 104. As used herein, the user interface device 126 may be used by a pilot to communicate with external sources, to modify or upload the program product 128, etc.

Regardless how the searchlight processing system 108 and user interface device 126 are specifically implemented, the searchlight processing system 108 receives the beam data from the searchlight assembly 106. The searchlight processing system 108 is also coupled to receive aircraft data, which includes at least aircraft location and aircraft attitude. It is noted that the aircraft data may, in some embodiments, be supplied from the searchlight assembly 106. In these embodiments, the one or more sensors 118 include one or more inertial sensors that are configured to supply these data. In other embodiments, the aircraft data may be supplied from an aircraft inertial navigation system 132 disposed within the aircraft 102.

Figure 2:
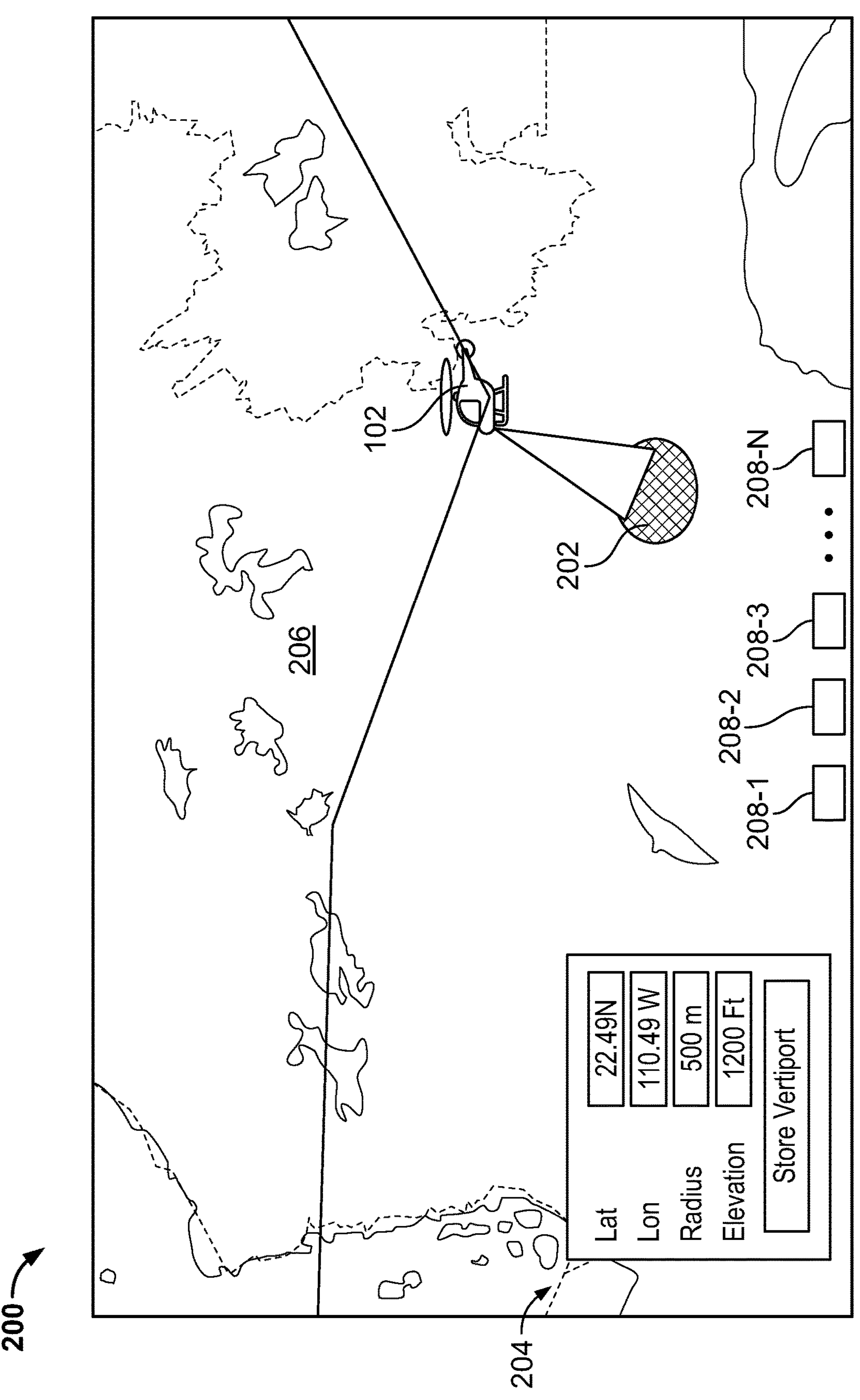
FIGS. 2-7 depict example embodiments of images that may be rendered on a display device of the system of FIG. 1.

No matter the source of the aircraft data, the searchlight processing system 108 is configured to process the aircraft data and the beam data to generate and supply geographic coordinate data for the point of interest. The searchlight processing system 108 is additionally configured to command the display device 104 to render an image that includes at least a graphical representation of the point of interest and the geographic coordinate data for the point of interest. One example of the rendered image 200 is depicted in FIG. 2, which illustrates one embodiment of the graphical representation of point of interest 202 and the geographical coordinate data 204 for the point of interest. In the depicted embodiment, graphical representation of the point interest 202 and the geographical coordinate data 204 are rendered overlying graphical representations of at least portions of the terrain 206 over which the aircraft 102 is flying. The rendered image 200 may also, in some embodiments, include a graphical representation of the aircraft 102.

Figure 3:
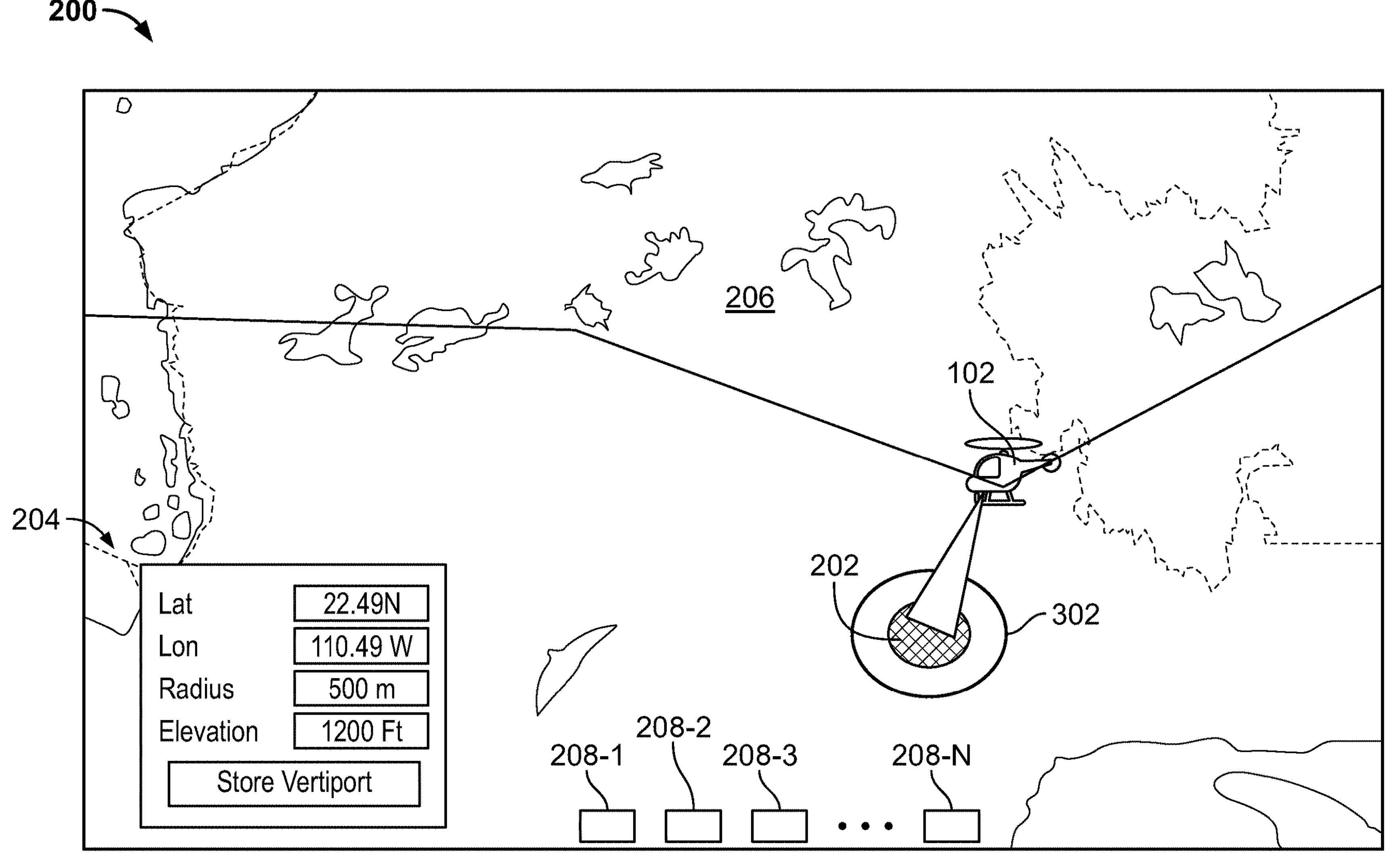

The geographical coordinate data 204 that are rendered may vary. In the depicted embodiment, these data are rendered in individual data fields that provide at least the latitude (Lat), longitude (Long), and Elevation of the point of interest. The geographical coordinate data 204 may also, as FIG. 2 depicts, include a data field that provides a radius measurement (Radius). The radius measurement, when provided, may correspond to the radius of the light beam on the ground (e.g., the radius of the point of interest) or it may be a user defined value 302 that is entered via the user interface device 126, and which may be larger (see FIG. 3) or smaller than the radius of the light beam on the ground (e.g., the radius of the point of interest).

In addition to commanding the display device 104 to render the image 200, the processing system 108 is also operable, in response to receiving a user input command via the user interface device 126, to transmit the geographic coordinate data to one or more aircraft avionics systems 134. In this regard, and as FIGS. 2 and 3 also depict, the rendered image 200 may also include one or more selectable buttons 208 (e.g., 208-1, 208-2, . . . 208-N) that, when selected via the user interface device 126, transmit the geographic coordinate data to the selected aircraft avionics system 134 (see FIG. 1). It will be appreciated that the one or more avionics systems 134 may vary and may include, for example, a terrain database 134-1, a flight management system 134-2, and a interactive navigation system (INAV) 134-N, just to name a few. Thus, the terrain database 134-1, and/or the flight management system 134-2, and/or the interactive navigation system (INAV) 134-3 may be updated in realtime to include the geographic coordinate data. To facilitate the transmission of data from the processing system 108 to the one or more avionics systems 134, and as FIG. 1 further depicts, the data transmission takes place via any one of numerous suitable data transmission gateways, such as an avionics data access partition (ADAP) 136, and an avionics standard communication bus (ACSB) 138.

In addition to transmitting the geographic coordinate data to one or more aircraft avionics systems 134, the searchlight processing system 108 may also be configured to at least selectively transmit at least the geographic coordinate data to platforms external to the aircraft 102 in which it is installed. Indeed, as FIG. 1 further depicts, the geographic coordinate data may be transmitted, via a suitable data transmitter 142, to one or more other aircraft 144, to a ground station 146, and/or to a remote data storage facility 148, such as a cloud-based storage and transmission service. In this regard, it will be appreciated that data transmission to the other aircraft 144 and/or ground station 146 may be via direct transmission or via the cloud-based storage and transmission service 148.

Figure 4:
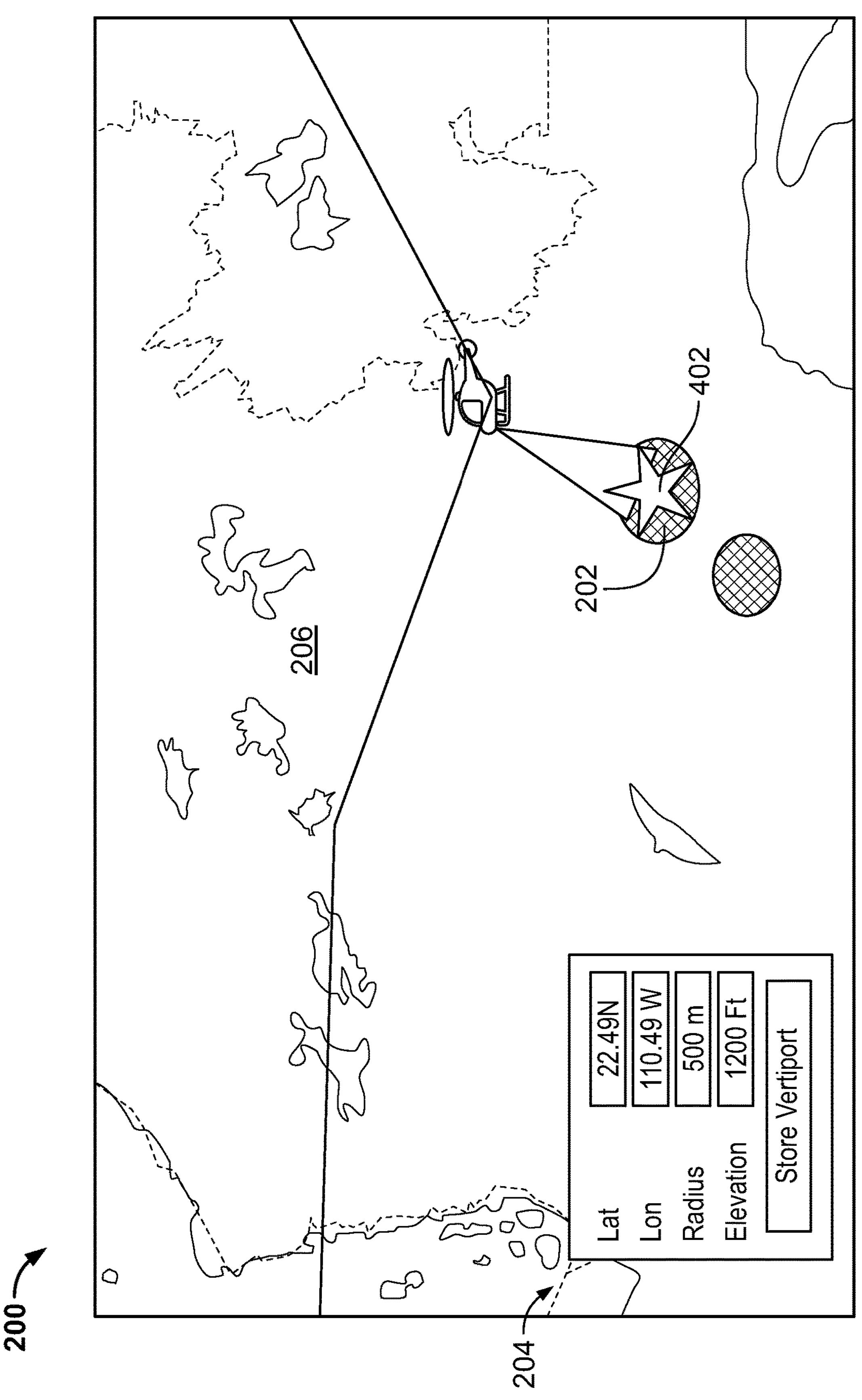

The searchlight processing system 108 may also be configured to implement additional functionality. For example, it may also, in some embodiments be configured, in response to the same or a separate user input command, to identify the point of interest 202 as an aircraft landing area. For example, if the point of interest 202 is sufficiently dimensioned to act as a vertiport, the user (e.g., pilot) may use to user interface to label the point of interest 202 as such. In such instances, this data is also transmitted to one or more of the avionics systems 134. Moreover, as FIG. 4 depicts, the rendered image 200 may be updated to include a graphic 402 that indicates the point of interest 202 may be used as a landing area/vertiport. Although the depicted graphic 402 is a star, in other embodiments the graphic 402 may be variously shaped.

Figure 5:
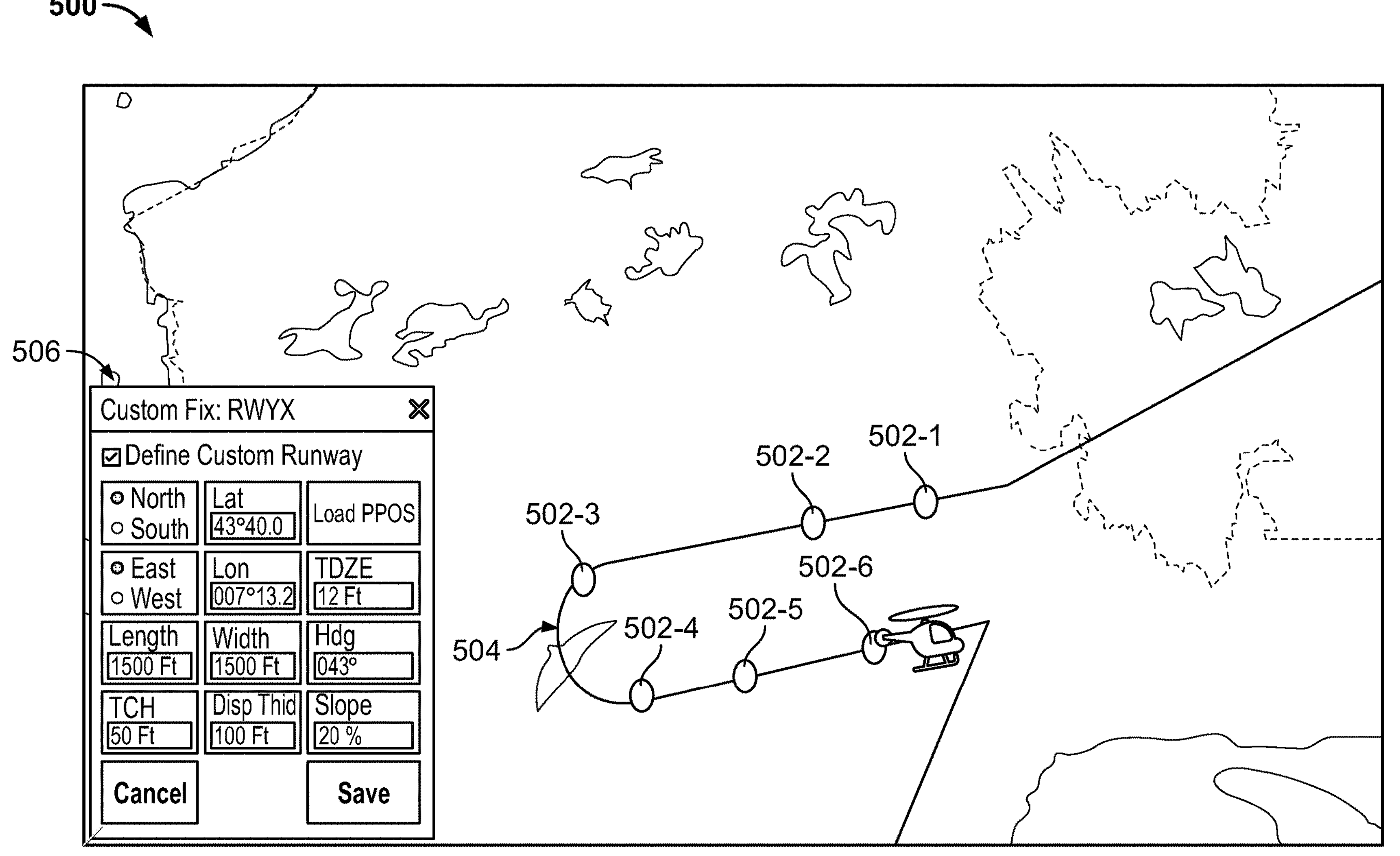

The searchlight processing system 108 is configured to store, in the onboard memory 122 or the terrain database 134-1, the geographic data associated with a plurality of points of interest, and to then selectively retrieve, in response, for example, to input to the user interface device 126, the stored geographic data associated with one or more points of interest. The searchlight processing system 108 may command the display device 104 to render an image 500, such as the one depicted in FIG. 5, that includes the retrieved points of interest 502 (e.g., 502-1, 502-2, 502-3, 502-4, 502-5, 502-6). The searchlight processing system 108 may then, in response to receiving a second user input command from the user interface 126, implement any one of numerous geometry algorithms to generate, and render on the display device 104, a custom runway 504 using the geographic data associated with the plurality of points of interest 502. If the custom runway 504 appears feasible to the pilot, the pilot may, via a user interface image 506 that is also rendered on the display device 104, store the custom runway 504 in one or more of the avionics systems 134. The custom runway 504 may, as described above, be transmitted to one or more other aircraft 144, to the ground station 146, or to the remote storage facility 148. It will be appreciated that the points of interest 502 may have been selected using the wide beam light source 114-1, the narrow beam light source 114-2 or, as depicted in FIG. 5, the laser light source 114-3.

Figure 6:
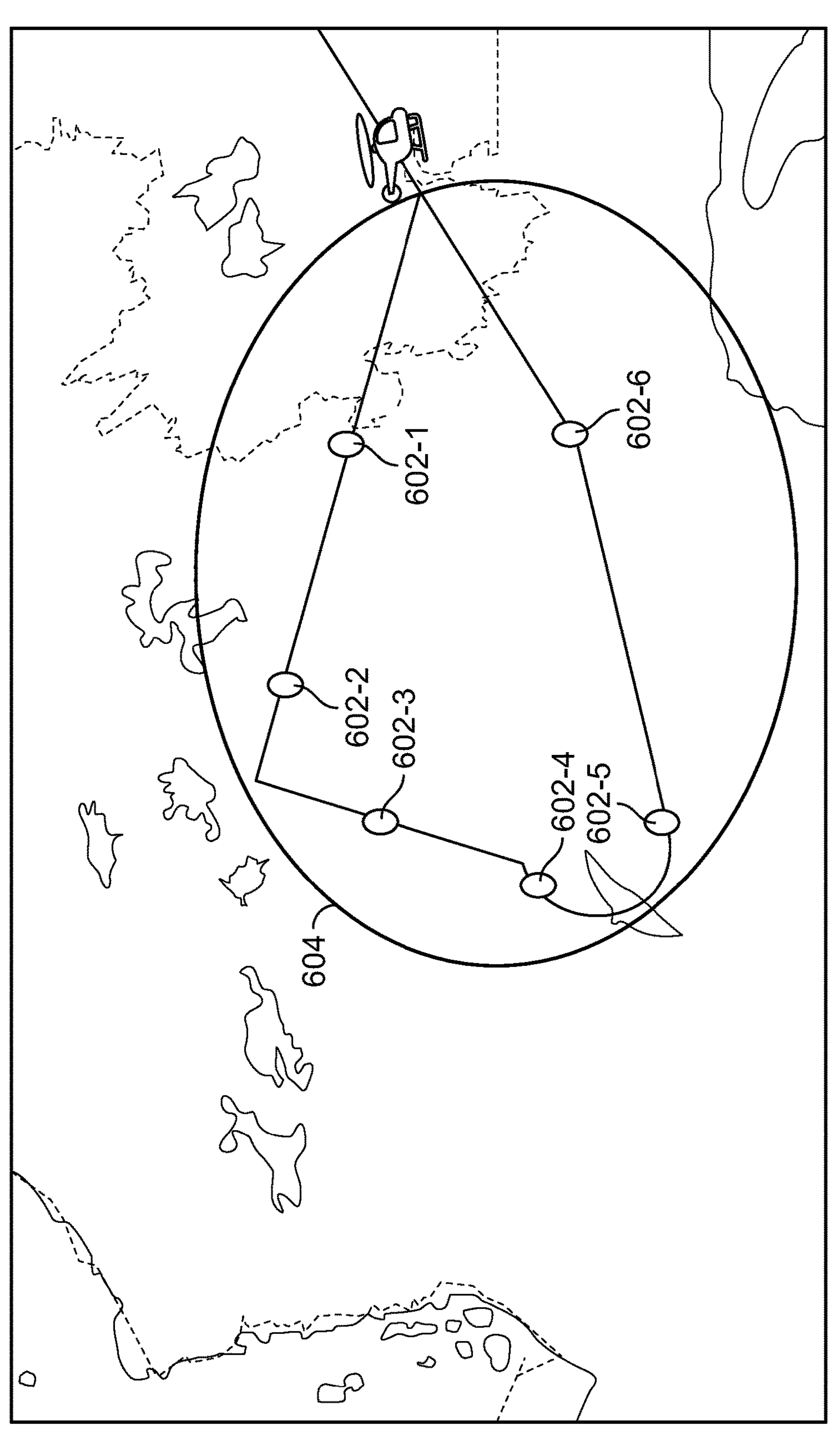

Referring now to FIG. 6, it is seen that the searchlight processing system 108 may also be configured to generate a defined search area geometry. More specifically, as just mentioned, the searchlight processing system 108 may selectively retrieve, in response, for example, to input to the user interface device 126, the stored geographic data associated with one or more points of interest. The searchlight processing system 108 may command the display device 104 to render the image 600 depicted in FIG. 6, which includes the retrieved points of interest 602 (e.g., 602-1, 602-2, 602-3, 602-4, 602-5, 602-6). The searchlight processing system 108 may then, in response to receiving a second user input command from the user interface 126, generate, and render on the display device 104, a defined search area geometry 604 around the geographic data associated with the plurality of points of interest 602. The defined search area geometry may, as described above, be transmitted to one or more other aircraft 144, to the ground station 146, or to the remote storage facility 148. Here too, it will be appreciated that the points of interest 602 may have been selected using the wide beam light source 114-1, the narrow beam light source 114-2 or, as depicted in FIG. 5, the laser light source 114-3.

Figure 7:
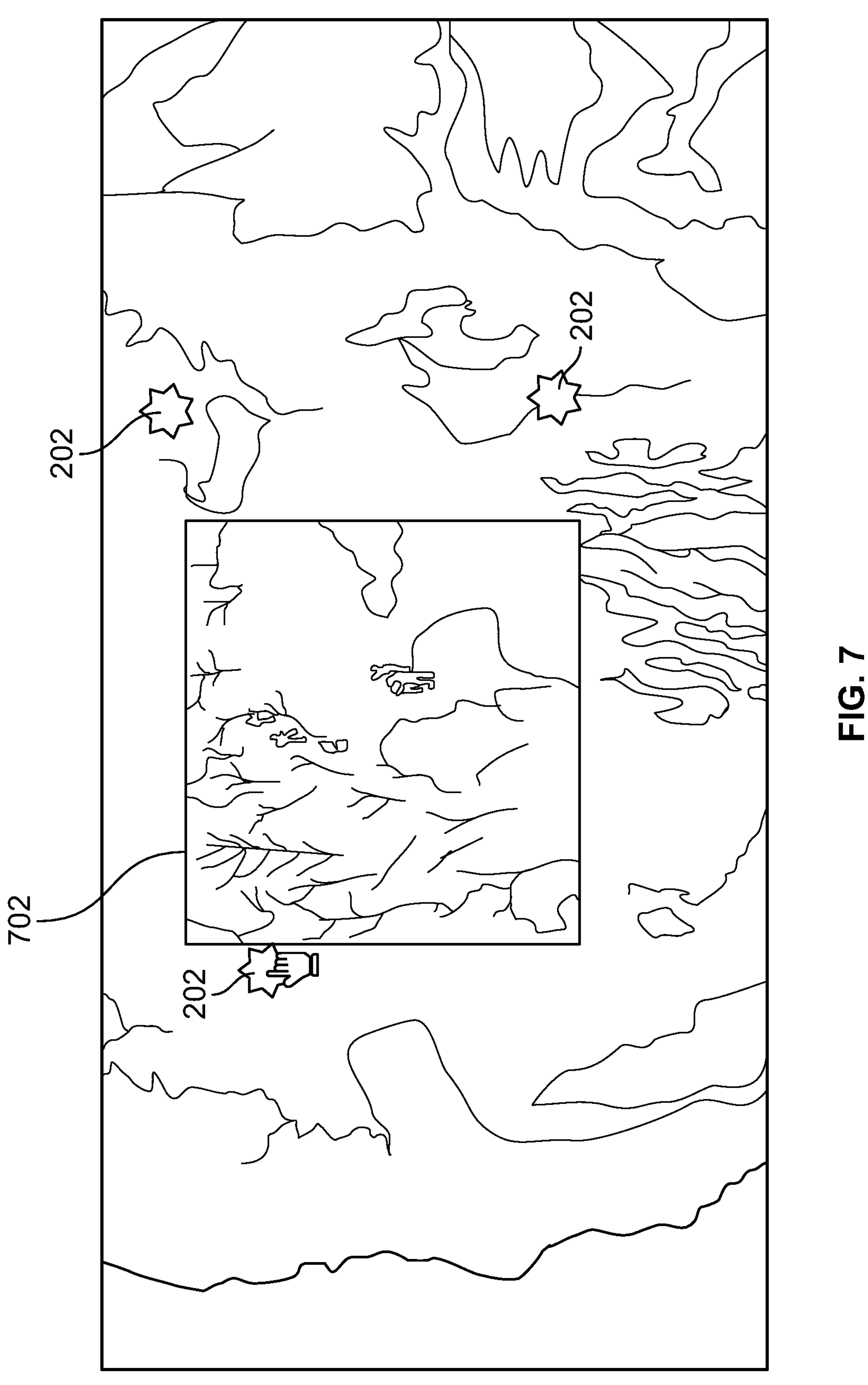

Returning once again to FIG. 1, it is noted that in some embodiments the system 100 may also include a camera 158. The camera 158, when included, may be disposed adjacent to or within the searchlight assembly 106. The camera 158, when included, is configured to capture images of the illuminated point (or points) of interest and to supply image data representative of the captured images to the searchlight processing system 108. The searchlight processing system 108 may be further configured to process the image data and at least selectively command the display device 104 to render the captured images. One example of the display device 104 rendering a captured image 702 at a particular point of interest 202 is depicted in FIG. 7. It will be appreciated that the camera 158, when included, may be any one of numerous infrared (IR) cameras, visual cameras, or a camera that is a combination of both, just to name a few.

Figure 8:
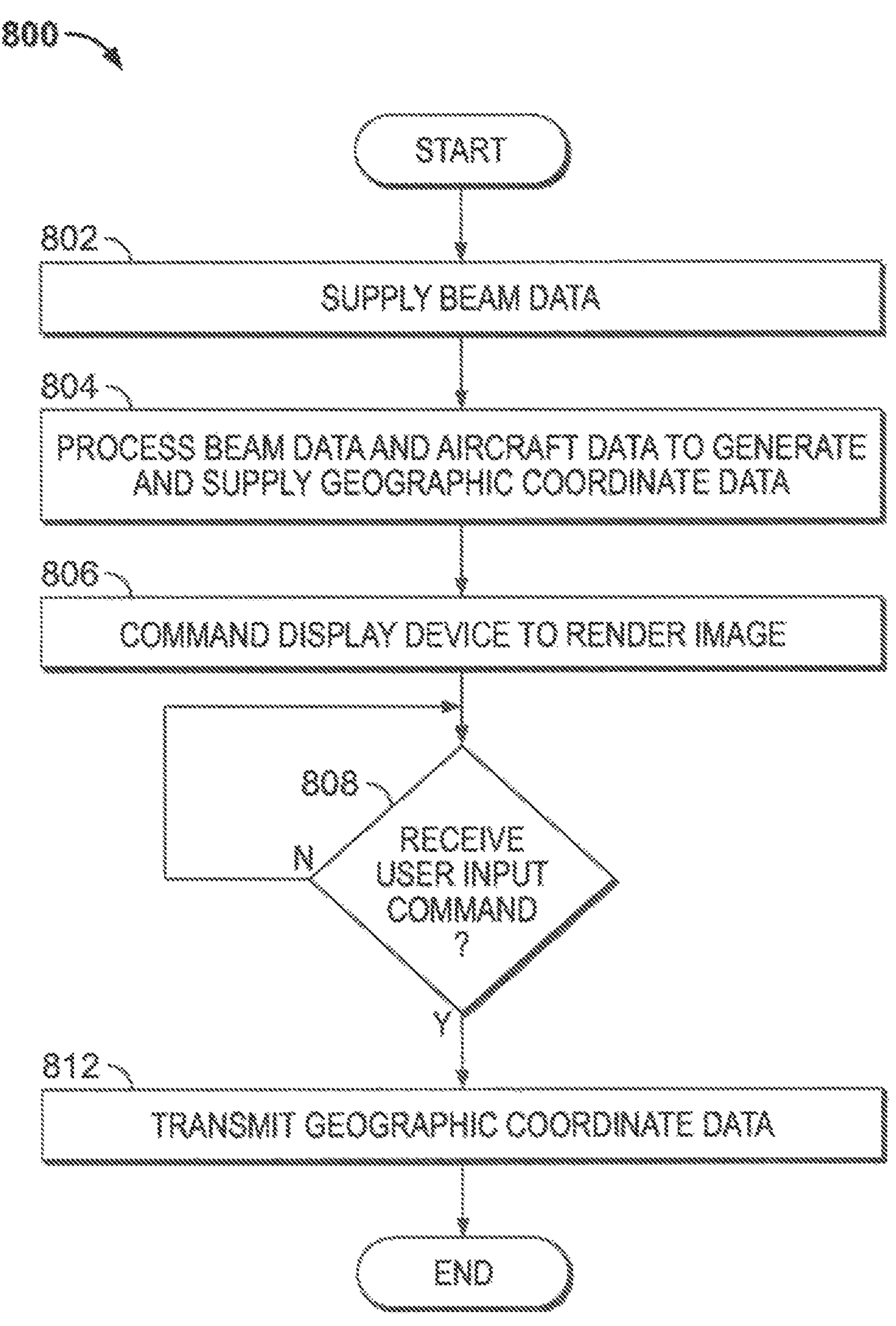
FIG. 8 depicts a process, in flowchart form, of a method that may be implemented in the system of FIG. 1.

The aircraft search and rescue mission effectiveness system 100 implements a search and rescue mission effectiveness method, such as the method 800 depicted in flowchart form in FIG. 8. The method 800 represents various embodiments of a method for improving search and rescue mission effectiveness. For illustrative purposes, the following description of method 800 may refer to elements mentioned above in connection with FIG. 1. In practice, portions of method 800 may be performed by different components of the described system 100. It should be appreciated that method 800 may include any number of additional or alternative tasks, the tasks shown in FIG. 8 need not be performed in the illustrated order, and method 800 may be incorporated into a more comprehensive procedure or method having additional functionality not described in detail herein. Moreover, one or more of the tasks shown in FIG. 8 could be omitted from an embodiment of the method 800 if the intended overall functionality remains intact.

The method starts and the searchlight processing system 108 is initialized and the system 102 is in operation. Beam data associated with a point of interest is supplied from the searchlight assembly 106 (802). The searchlight processing system 108 processes the beam data and the aircraft data to generate and supply geographic coordinate data for the point of interest (804). The searchlight processing system 108 commands the display device 104 to render an image that includes at least a graphical representation of the point of interest and the geographic coordinate data for the point of interest (806). The searchlight processing system 108 may the receive a user input command from a user interface device (808) and, in response to receiving the user input command, transmit the geographic coordinate data to one or more aircraft avionics systems (812).

Thus, the system 100 described herein is a technologically improved search and rescue system and method. This system and method provides techniques in which a pilot or crew member can use searchlight assembly not only to illuminate, but also to capture the location details associated with, points of interest. And further to communicate the location details to other avionics systems to accomplish on-board mission objectives. For example, the proposed system can derive the required parameters to define custom runway from the searchlight point of interest data. The proposed system allows quick and easy capture of points of interest data, unlike the offline processing known in current systems. With minimal input, a pilot can select points of interest, generate areas of interest such as a custom runway, and perform the necessary computations for landing feasibility. The custom runway can be made available for further search, and it can be shared with other aircraft in the same mission, so that other aircraft can focus on the mission rather looking for landing spots, thereby improving the overall system and mission effectiveness.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft search and rescue mission effectiveness system, comprising:

a display device responsive to display commands to render one or more images;

a searchlight assembly adapted to be mounted on an aircraft and configured to emit a light beam toward, and thus illuminate, a point of interest, the searchlight assembly further configured to supply beam data, the beam data including at least light beam orientation and distance from the searchlight assembly to the point of interest; and a searchlight processing system coupled to receive aircraft data that includes at least aircraft location and aircraft attitude, the searchlight processing system in operable communication with the display device and the searchlight assembly and configured to:

(i) process the aircraft data and the beam data to generate and supply geographic coordinate data for the point of interest, (ii) command the display device to render an image that includes at least a graphical representation of the point of interest and the geographic coordinate data for the point of interest, (iii) receive a first user input command from a user interface device, (iv) in response to receiving the first user input command, transmit the geographic coordinate data to one or more aircraft avionics systems, (v) store the geographic data associated with a plurality of points of interest, (vi) in response to receiving a second user input command from the user interface, to retrieve the geographic data associated with the plurality of points of interest, (vii) in response to receiving a third user input command from the user interface, to generate a defined search area geometry around the geographic data associated with the plurality of points of interest, and (viii) command the display device to render an image that includes the defined search area geometry and the geographic data associated with the plurality of points of interest.

2. The system of claim 1, wherein the searchlight processing system is further configured, in response to receiving the user input command, to identify the point of interest as an aircraft landing area.

3. The system of claim 1, wherein the searchlight processing system is further configured to:

store the geographic data associated with a plurality of points of interest; and in response to receiving a second user input command from the user interface, to generate at least one runway using the geographic data associated with the plurality of points of interest.

4. The system of claim 1, wherein the one or more avionics systems comprise:

a terrain database; and a flight management system.

5. The system of claim 4, wherein the searchlight processing system is further configured to at least selectively transmit the geographic coordinate data to another aircraft.

6. The system of claim 4, wherein the searchlight processing system is further configured to at least selectively transmit the geographic coordinate data to a ground station.

7. The system of claim 4, wherein the searchlight processing system is further configured to at least selectively transmit the geographic coordinate data to a remote data storage facility.

8. The system of claim 1, further comprising:

a camera disposed adjacent to the searchlight assembly to capture images of the illuminated point of interest and supply image data representative of the captured images to the searchlight processing system, wherein the searchlight processing system is further configured to process the image data and command the display device to render the captured images.

9. The system of claim 1, wherein the search light assembly is further configured to supply the aircraft data that includes at least the aircraft location and the aircraft attitude.

10. An aircraft search and rescue mission effectiveness method, comprising the steps of:

supplying beam data from a searchlight assembly that is adapted to be mounted on an aircraft and that is configured to emit a light beam toward, and thus illuminate, a point of interest, the beam data including at least light beam orientation and distance from the searchlight assembly to the point of interest;

processing, in a searchlight processing system, the beam data and aircraft data that includes at least aircraft location and aircraft attitude to generate and supply geographic coordinate data for the point of interest;

commanding, via the searchlight processing system, a display device to render an image that includes at least a graphical representation of the point of interest and the geographic coordinate data for the point of interest;

receiving, at the searchlight processing system, a user input command from a user interface device;

transmitting, via the searchlight processing system, the geographic coordinate data to one or more aircraft avionics systems in response to receiving the user input command;

storing the geographic data associated with a plurality of points of interest;

retrieving, in response to receiving a second user input command from the user interface, the geographic data associated with the plurality of points of interest;

generating, in response to receiving a third user input command from the user interface, a defined search area geometry around the geographic data associated with the plurality of points of interest; and commanding the display device to render an image that includes the defined search area geometry and the geographic data associated with the plurality of points of interest.

11. The method of claim 10, further comprising:

identifying the point of interest, via the searchlight processing system, as an aircraft landing area in response to receiving the user input command.

12. The method of claim 10, further comprising:

storing the geographic data associated with a plurality of points of interest; and generating, in response to receiving a second user input command from the user interface, at least one runway using the geographic data associated with the plurality of points of interest.

13. The method of claim 10, further comprising selectively transmitting the geographic coordinate data to another aircraft.

14. The system of claim 10, further comprising selectively transmitting the geographic coordinate data to a ground station.

15. The method of claim 10, further comprising selectively transmitting the geographic coordinate data to a remote data storage facility.

16. The method of claim 10, further comprising:

capturing images of the illuminated point of interest via a camera that is disposed adjacent to the searchlight assembly;

supplying image data representative of the captured images from the camera to the searchlight processing system;

processing the image data in the searchlight processing system; and commanding the display device, via the searchlight processing system, to render the captured images.

17. The method of claim 10, wherein the aircraft data that includes at least the aircraft location and the aircraft attitude are supplied from the search light assembly.

18. An aircraft, comprising:

a fuselage;

a display device disposed within the fuselage and responsive to display commands to render one or more images;

a searchlight assembly mounted on the fuselage and configured to emit a light beam toward, and thus illuminate, a point of interest, the searchlight assembly further configured to supply beam data, the beam data including at least light beam orientation and distance from the searchlight assembly to the point of interest;

a searchlight processing system coupled to receive aircraft data that includes at least aircraft location and aircraft attitude, the searchlight processing system in operable communication with the display device and the searchlight assembly and configured to:

(i) process the aircraft data and the beam data to generate and supply geographic coordinate data for the point of interest, (ii) command the display device to render an image that includes at least a graphical representation of the point of interest and the geographic coordinate data for the point of interest, (iii) receive a user input command from a user interface device, (iv) in response to receiving the user input command, transmit the geographic coordinate data to one or more aircraft avionics systems, (v) store the geographic data associated with a plurality of points of interest, (vi) in response to receiving a second user input command from the user interface, to retrieve the geographic data associated with the plurality of points of interest, (vii) in response to receiving a third user input command from the user interface, to generate a defined search area geometry around the geographic data associated with the plurality of points of interest, and (viii) command the display device to render an image that includes the defined search area geometry and the geographic data associated with the plurality of points of interest.

* * * * *